Jan. 21, 1964     L. KRAUS ETAL     3,118,515
DRIVE FOR SWINGING HALF AXLES
Filed July 6, 1961
FIG 1
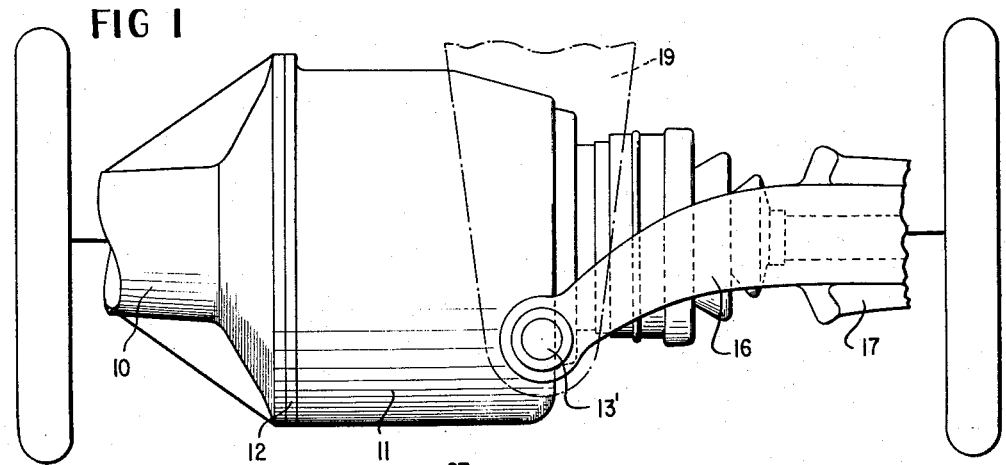
FIG 2
FIG 3
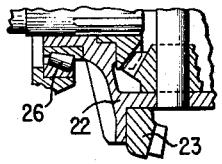
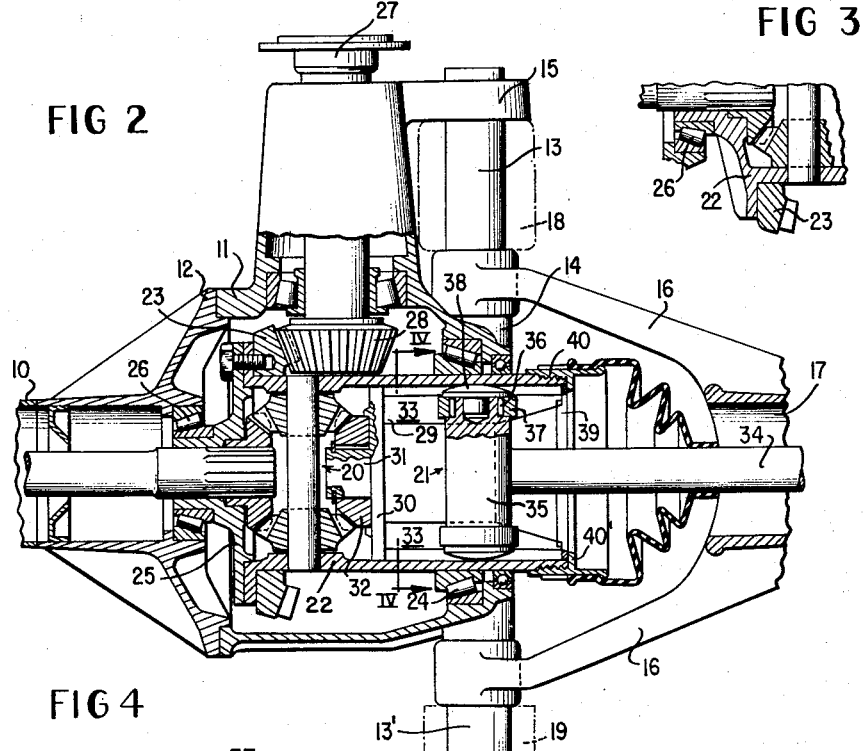
FIG 4
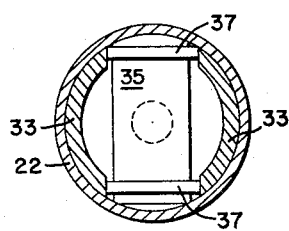
INVENTORS.
LUDWIG KRAUS
ANTON ALLERT
BY
ATTORNEYS.

United States Patent Office 3,118,515
Patented Jan. 21, 1964

3,118,515
DRIVE FOR SWINGING HALF AXLES
Ludwig Kraus, Stuttgart-Sillenbuch, and Anton Allert, Stuttgart-Unterturkheim, Germany, assignors to Daimler-Benz Aktiengesellschaft, Stuttgart-Unterturkheim, Germany
Filed July 6, 1961, Ser. No. 122,314
Claims priority, application Germany July 14, 1960
1 Claim. (Cl. 180—73)

The present invention relates to an axle drive for motor vehicles having swinging half axles of which one swinging half axle is rigidly connected with the axle drive housing while the two swinging half axles are pivotally connected at the vehicle superstructure such as at the frame or self-supporting body with a common swinging or swivel axis disposed lower than the wheel centers of the wheels carried by the swinging half axles.

It is proposed according to the present invention to provide, within the axle drive housing, a housing rotatable about a vehicle transverse axis which serves as a differential housing as well as housing for the driving joint constructed as slidable universal joint for that wheel drive shaft which is coordinated to or associated with the swinging half axle that is not rigidly connected with the axle drive housing.

By the use of such a common housing, there is achieved a relatively short and compact construction which is not only of light weight and relatively inexpensive, but also enables a kinematically favorable rapprochement of the differential and of the slidable universal joint. Additionally, the construction in accordance with the present invention enables a simple assembly of the differential gear wheels and shafts, and the housing becomes more sturdy in itself than the usual differential housing which normally is weakened by the relatively large apertures necessitated for the introduction of the differential gear wheels.

In particular, it is proposed in accordance with the present invention, to construct the common housing as a continuous uninterrupted cylinder which is operatively connected at one end thereof with the bevel gear wheel of the axle drive, adjacent thereto supports the crosspiece of the differential gear, and at the other end thereof accommodates the slidable universal cross joint. The arrangement may thereby be so chosen that the driving member of the slidable universal joint is constructed as a forked drum-member carrying the associated driven differential gear wheel and supported along the inside wall of the cylinder.

It is additionally proposed in accordance with the present invention to insert at the open face of the forked drum-member a preferably stepped annular member or ring which supports or braces the open forked ends with respect to each other. For purposes of axially fixing the forked drum-member, a nut provided with an inwardly projecting flange constituting an abutment for the forked drum member may be provided at one end of the cylinder which nut is screw threaded thereupon.

Accordingly, it is an object of the present invention to provide an axle drive gear including differential gear and slidable universal joint means for swinging half axles of the type mentioned hereinabove which effectively eliminates the disadvantages encountered with the prior art constructions.

It is another object of the present invention to provide an axle drive arrangement for the swinging half axles supporting the driven wheels of a motor vehicle which permits a relatively short and compact construction that is of relatively light weight and inexpensive with respect to both manufacture and assembly.

Another object of the present invention is the provision of an axle drive arrangement for swinging half axles which permit a more close spacing of the differential gear and slidable universal cross joint to thereby favorably affect the kinematics of the drive arrangement.

A further object of the present invention resides in the provision of an axle drive arrangement for swinging half axles of a motor vehicle which is relatively sturdy yet simple in construction and easy to install and disassemble, in case of repairs.

These and other objects, features and advantages of the present invention will become more obvious from the following description when taken in connection with the accompanying drawing, which shows, for purposes of illustration only, two embodiments in accordance with the present invention, and wherein FIGURE 1 is a partial end elevational view of an axle drive arrangement in accordance with the present invention with the wheels of the vehicle indicated schematically, FIGURE 2 is a partial cross sectional view through the axle drive arrangement of FIGURE 1, the cross section being taken in an essentially horizontal plane, FIGURE 3 is a partial cross sectional view, similar to FIGURE 2, illustrating the details of a modified embodiment of an axle drive arrangement in accordance with the present invention, and FIGURE 4 is a cross sectional view taken through the cylinder 22 according to section line IV—IV.

Referring now to the drawing wherein like reference numerals are used throughout the various views to designate like parts, and more particularly to FIGURES 1 and 2, reference numeral 10 designates therein the left swinging half axle which is rigidly connected, in any suitable manner, with the axle drive housing 11 through the flanged connection 12 thereof. The axle drive housing 11 carries a pivot pin 13 which is secured at 14 within the central housing body portion and at 15 within an arm arranged at one housing end. Coaxial to the pivot pin 13 is secured a second pin 13' at the opposite side of the housing 11. The fork arms 16 of the right swinging half axle 17 swing about the bearing pins 13 and 13'. On the other hand, the bearing pins 13 and 13' serve for purposes of suspending the axle drive arrangement by means of suitable support means 18 and 19 of any suitable construction and indicated in FIGURES 1 and 2 in dot and dash line which suspendingly support the axle drive arrangement at the vehicle superstructure such as the frame or vehicle body of a self-supporting type body construction.

The bevel gear differential generally designated by reference numeral 20 and the slidable universal joint generally designated by reference numeral 21 are accommodated within a common cylindrical housing 22 to which is flangedly connected, in any suitable manner, for example, by screws or bolts, to the bevel gear wheel 23 of the axle drive. The cylindrical housing 22 is supported by means of bearings 24 within the axle gear housing 11 and by the interposition of an intermediate member 25 and bearings 26 at the left swinging half-axle 10.

Of course, the common cylindrical housing 22 together with the bevel gear 23 may also be supported by suitable bearings 26 directly at the left swinging half axle 10 as illustrated in FIGURE 3.

The drive of the bevel gear 23 takes place in the usual manner by means of a pinion or bevel gear 28 driven from a conventional drive connection 27.

A forked drum-member 29 is rotatably supported within the cylinder 22 whereby the bottom 30 of the forked drum member 29 carries a pin-shaped extension 31 which is splined in any suitable manner to the driven differential gear wheel 32. The two forked portions of the forked drum member 29 effectively provide therebetween slots 33 in which the cross member 35 of the slidable universal joint 21 which is operatively connected with the right wheel-drive-shaft 34 is adapted to slide to permit relative axial movement between the relatively fixed differential gear and the wheel drive shaft 34 accommodated within swinging half axle 17. For purposes of reducing the friction within the universal joint, rings 37 are provided which are supported on needle bearings 36. The cross member 35 is in line contact with the inner surface of the cylinder housing 22 by means of spherically shaped mushroom heads 38. A ring 39 is secured with the aid of small screws at the prongs of forked drum member 29 at the right end face thereof which ring 39 is provided with a stepped portion and supports the two prongs with respect to each other by means of the stepped portion.

A nut 40 is threadably mounted over the cylinder 22 which nut 40 is provided with an inwardly extending flange 40'. This flange 40' fixes the forked drum-member 29 in the axial direction thereof.

While we have shown and described two embodiments in accordance with the present invention, it is understood that the same is not limited thereto but is susceptible of many changes and modifications within the spirit and scope thereof and we, therefore, do not wish to be limited to the details shown and described herein but intended to cover all such changes and modifications as are encompassed by the scope of the appended claims.

We claim:

An axle drive for motor vehicles having a pair of swinging half-axles each including a drive shaft, comprising axle drive housing means, rotatable housing means arranged substantially within said axle drive housing means and constructed as a substantially uninterrupted cylinder, said cylinder having one end extending outwardly of said axle drive housing means, means for supporting said cylinder within said axle drive housing means so as to be rotatable about a substantially transverse vehicle axis, said supporting means being spaced from said one end of said cylinder extending out of said axle drive housing means, differential gear means arranged within said cylinder adjacent the other end thereof including an axle drive bevel gear secured to said cylinder adjacent said other end thereof, a differential cross piece and a plurality of differential gear wheels, closure means for said other end of said cylinder, universal joint means adapted to form a driving joint for one of said half-axles arranged wholly within said cylinder adjacent said one end thereof, said universal joint means including a driving element constructed as a forked drum member rotatably supported on the inside of said cylinder adjacent said one end thereof, said drum member having secured thereto an associated driven differential gear wheel of said differential gear means, said forked drum member having open prong ends defining an open end extending toward said one end of said cylinder, ring means inserted into the open end of said forked drum member to support the open prong ends, and nut means threadably secured to said one end of said cylinder, said nut means having inwardly directed flange means for axially retaining said forked drum member within said cylinder, one of said drive shafts being operatively connected with another of the differential gear wheels of said differential gear means and the other drive shaft being operatively connected with said universal joint means.

References Cited in the file of this patent

UNITED STATES PATENTS

| | | |
|---|---|---|
| 2,843,214 | Muller | July 15, 1958 |
| 2,854,087 | Schernberg | Sept. 30, 1958 |
| 2,857,975 | Thorne | Oct. 28, 1958 |
| 2,891,392 | Wildhaber | June 23, 1959 |
| 2,906,106 | Haas | Sept. 29, 1959 |
| 2,968,358 | De Lorean | Jan. 17, 1961 |

FOREIGN PATENTS

| | | |
|---|---|---|
| 1,111,379 | France | Oct. 26, 1955 |
| 1,161,981 | France | Mar. 31, 1958 |